United States Patent
Bensmann et al.

(10) Patent No.: US 12,250,950 B2
(45) Date of Patent: Mar. 18, 2025

(54) KNEADING MACHINE FOR DOUGH WITH PINCH PROTECTION

(71) Applicant: DIOSNA Dierks & Söhne GmbH, Osnabrück (DE)

(72) Inventors: Stefan Bensmann, Osnabrück (DE); Hashem Ghani, Osnabrück (DE)

(73) Assignee: DIOSNA DIERKS & SÖHNE GMBH, Osnabrück (DE)

( * ) Notice: Subject to any disclaimer, the term of this patent is extended or adjusted under 35 U.S.C. 154(b) by 632 days.

(21) Appl. No.: 17/633,325

(22) PCT Filed: Aug. 7, 2020

(86) PCT No.: PCT/EP2020/072222
§ 371 (c)(1),
(2) Date: Feb. 7, 2022

(87) PCT Pub. No.: WO2021/023852
PCT Pub. Date: Feb. 11, 2021

(65) Prior Publication Data
US 2022/0354129 A1    Nov. 10, 2022

(30) Foreign Application Priority Data
Aug. 7, 2019 (EP) .................... 19190420

(51) Int. Cl.
*A21C 1/02* (2006.01)
*A21C 1/14* (2006.01)
(52) U.S. Cl.
CPC ............ *A21C 1/02* (2013.01); *A21C 1/144* (2013.01); *A21C 1/145* (2013.01); *A21C 1/148* (2013.01)

(58) Field of Classification Search
CPC .......... A21C 1/02; A21C 1/148; A21C 1/1485
See application file for complete search history.

(56) References Cited

U.S. PATENT DOCUMENTS 4,863,278 A * 9/1989 Otto ...................... B01F 27/808
366/601
4,919,539 A * 4/1990 Drocco .................... A21C 1/02
366/94

(Continued)

FOREIGN PATENT DOCUMENTS

| CN | 208764651 U | 4/2019 |
| IT | VI20060294 A1 | 4/2008 |

OTHER PUBLICATIONS

Official Communication issued in International Patent Application No. PCT/EP2020/072222, issued on Feb. 8, 2022.

(Continued)

*Primary Examiner* — Elizabeth Insler
(74) *Attorney, Agent, or Firm* — Keating & Bennett, LLP

(57) ABSTRACT

A kneading machine includes a kneading machine frame with a lower portion and a head movable relative to the lower portion between a lower operating position and an upper cleaning position. A kneading bowl is on the lower portion and a drivable kneading tool and a lid closing an opening of the kneading bowl in the operating position are the head. The lid is surrounded on a circumferential side by a first safety ring of a safety device which projects beyond the lid on an underside thereof, and which is movably fastened to the lid. The safety device includes a detector to detect a relative movement between the lid and the first safety ring. The kneading machine frame includes at least two trunnion bearings, each defined by a trunnion and a matching receptacle.

15 Claims, 4 Drawing Sheets

(56) References Cited

U.S. PATENT DOCUMENTS

| | | | | |
|---|---|---|---|---|
| 5,207,506 A | * | 5/1993 | Musseau | A21C 1/144 |
| | | | | 366/601 |
| 6,997,597 B2 | * | 2/2006 | Drocco | B01F 35/92 |
| | | | | 366/94 |

OTHER PUBLICATIONS

English translation of Official Communication issued in International Patent Application No. PCT/EP2020/072222, mailed on Nov. 25, 2020.

Official Communication issued in International Patent Application No. PCT/EP2020/072222, mailed on Nov. 25, 2020.

Official Communication issued in European Patent Application No. 19190420.0, issued on Dec. 3, 2019.

Escher Mixers, "Brochure Spiral MD-W line", Dec. 31, 2018, [retrieved on Nov. 22, 2019], 9 pages, Retrieved from the Internet: <url: https://www.eschermixers.com/images/EscherMixers_MD-MDW-line.pdf/>.

\* cited by examiner

KNEADING MACHINE FOR DOUGH WITH PINCH PROTECTION

CROSS REFERENCE TO RELATED APPLICATIONS

This is a U.S. national stage of PCT Application No. PCT/EP2020/072222, filed on Aug. 7, 2020, and with priority under 35 U.S.C. § 119 (a) and 35 U.S.C. § 365 (b) being claimed from European Application No. 19190420.0, filed on Aug. 7, 2019, the entire disclosures of which are hereby incorporated herein by reference.

FIELD OF THE INVENTION

The present disclosure relates to a dough kneading machine, and to a method of pivoting a kneading tool into a kneading bowl.

BACKGROUND

Kneading machines for doughs, in particular, baking doughs, have a kneading bowl of various sizes for dough masses of 100 to 1000 kg, into each of which a motor-driven kneading tool can be inserted to carry out the kneading process. During operation, the kneading bowl is closed by a lid. After completion of the kneading process, the tool is moved out. Kneading machines with center discharge devices in the bottom are known. Once the kneading process is complete, the dough is discharged downward through these center discharge devices and can be transferred to a line portioner, for example, with the aid of a transport system.

When the kneading tool is moved into and out of the kneading bowl, there is a risk that a person's limbs may get caught in the gap between the kneading bowl and the lid and that the closing forces exerted may cause injuries. To reduce or eliminate the risk of injury, a safety ring is provided which surrounds the lid on the circumferential side and projects beyond the lid in the direction of the kneading bowl, on the underside. The safety ring is attached to the lid so that it can move relative to the lid. In the event of entrapment, the first thing the safety ring does is to strike an object or limb placed between the lid and the kneading bowl. This causes the safety ring to move relative to the lid, which moves even further. This relative movement is used to actuate a switch, which reverses the direction of rotation of the electric motor provided for inserting the kneading tool into the bowl.

In an open concept kneading machine, there are other pinch points that create potential hazards when the kneading tool swings into the bowl.

SUMMARY

Example embodiments of the present disclosure are able to ensure a safe swiveling of a kneading tool of a kneading machine with an open concept in a cost-effective and simple manner.

An example embodiment of a kneading machine for food doughs according to the present disclosure includes a kneading machine frame with a lower portion and a head movable relative to the lower portion between a lower operating position and an upper cleaning position is provided. A kneading bowl can be provided on the lower portion and a drivable kneading tool and a lid closing an opening of the kneading bowl in the operating position are on the head. The lid is surrounded circumferentially by a first safety ring of a safety device which projects beyond the lid on an underside thereof and which is movably secured thereto, the safety device including a detector to detect a relative movement between the lid and the first safety ring. The kneading machine frame includes at least two trunnion bearings, each defined by a trunnion and a matching receptacle, one of the trunnion and the receptacle being on the lower portion and the other of the trunnion and the receptacle being on the head to interlock in a lower operating position and secure a position of the head relative to the lower portion. The first safety ring is a one piece structure with a pinch protector of the at least two trunnion bearings. The pinch protector is thus particularly cost-effective and extends the already existing safety ring.

Preferably, the kneading machine is structured to accommodate dough masses in a range of about 100 kg to about 1000 kg.

The head of the kneading machine can be pivoted with respect to the lower portion or moved perpendicularly to it.

The kneading bowl can include a closable bottom outlet or can be swiveled or removed from the kneading machine to discharge the dough mass.

Preferably, the pinch protector of each trunnion bearing includes a further safety ring, which circumferentially surrounds the trunnion bearing attached to the head on the circumferential side and projects downwards, so that an overlap is provided. This structure represents a simple but safe pinch protector because the safety rings are one piece structures integral with the first safety ring, such that a relative movement between the trunnion bearing and the safety ring can be detected by the detector.

It is advantageous if the overlap of the pinch protector for the at least two trunnion bearings is greater than a height of the trunnion or a depth of penetration of the trunnion into the receptacle, so that it can be ensured that an obstacle cannot be pinched.

Preferably, the trunnions are tapered in the direction of the receptacle to center the head on the lower portion.

In an advantageous example embodiment of the present disclosure, the kneading machine includes two trunnion bearings, each on one side of the kneading bowl.

It is advantageous if the trunnions are attached to the lower portion and the head includes the corresponding receptacles.

Preferably, the detector is structured in such a way that a relative movement between the head and the safety ring of the trunnion bearing can also be detected.

It may additionally be provided that the safety device includes a second detector to detect a relative movement between the head and the safety ring of the trunnion bearings.

A safety ring is preferably cylindrical or substantially cylindrical and includes a circumferential skirt with two edge regions bent over to stiffen the safety ring.

The safety ring is preferably made of stainless steel sheet with a thickness of between about 1 mm and about 3 mm. It is advantageous if the lower edge region spaced away from the lid preferably has a width of between about 5 mm and 15 mm, and in particular between 5 mm and 10 mm.

Furthermore, an example embodiment of a method of pivoting a kneading tool into a kneading bowl of the previously described kneading machine according to the present disclosure includes:
  a) moving the head relative to the lower portion from an upper cleaning position to a lower operating position,
  b) inserting an obstacle into a trunnion bearing that is still open, c) detecting relative movement between the safety device and the head, and d) moving the head in a direction of the upper cleaning position.

The head can be moved hydraulically or by an electric motor. Preferably, in d), the head is moved completely back into the upper cleaning position, in particular, swiveled.

The detecting in c) can be carried out by the detector or a second detector attached to the safety rings of the trunnion bearings in addition to the detector.

The method further preferably includes, after a):

e) inserting an obstacle between the kneading bowl and the lid, f) detecting relative movement between the first safety ring and the lid, and g) controlling the electric motor of the swivel drive so that the head is moved in the direction of the upper cleaning position.

The safety device can thus monitor all pinch points that provide potential danger when the kneading tool swings into the bowl and trigger a reaction to swivel the kneading tool back.

The above and other elements, features, steps, characteristics and advantages of the present disclosure will become more apparent from the following detailed description of the example embodiments with reference to the attached drawings.

BRIEF DESCRIPTION OF THE DRAWINGS

Example embodiments of the present disclosure are explained in more detail below with reference to the drawings. Similar or similarly acting components are designated in the figures with the same reference signs.

DETAILED DESCRIPTION

Figure 1:
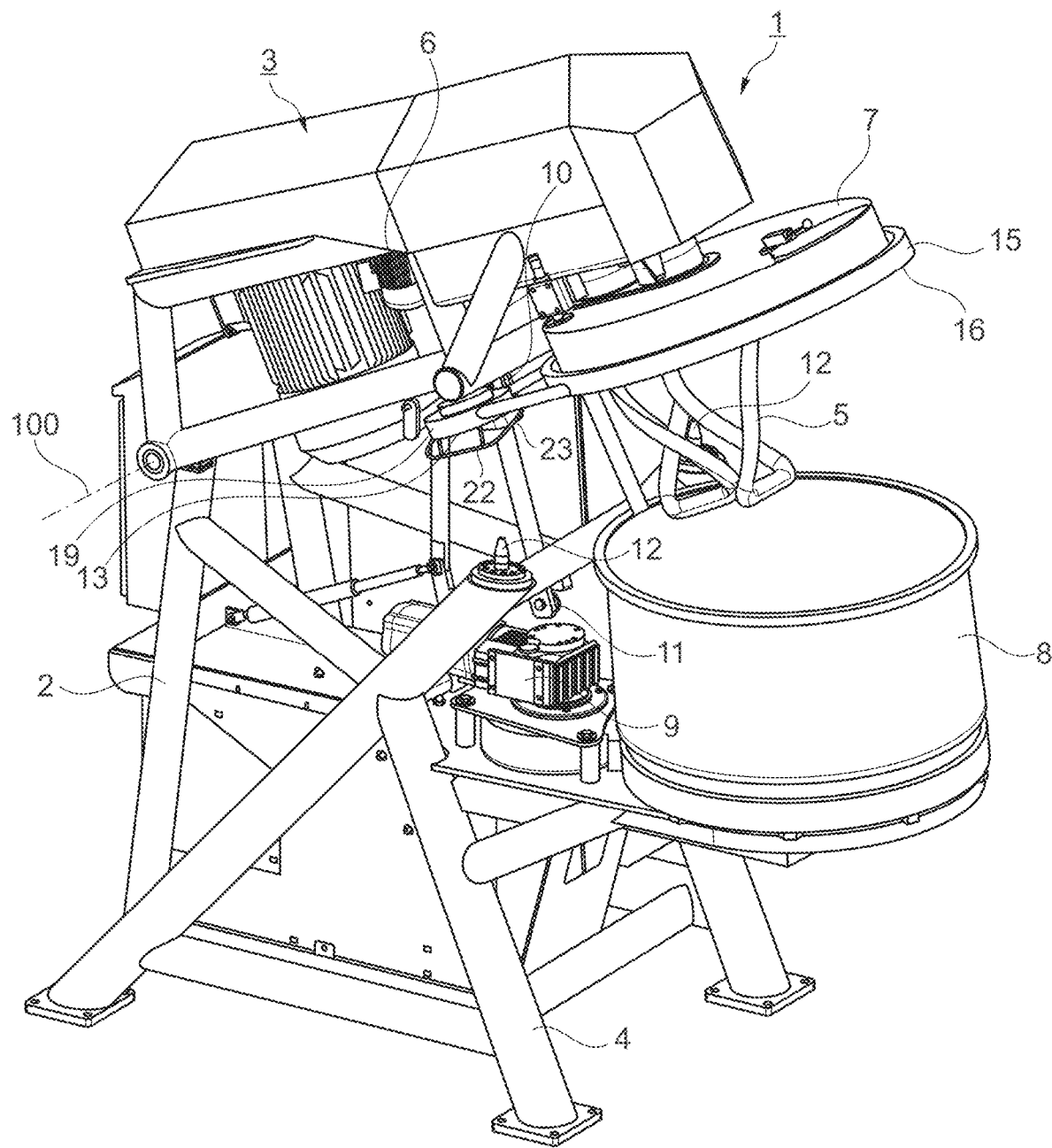
FIG. 1 shows a spatial representation of a kneading machine with kneading bowl in an upper cleaning position according to an example embodiment of the present disclosure.
Figure 2:
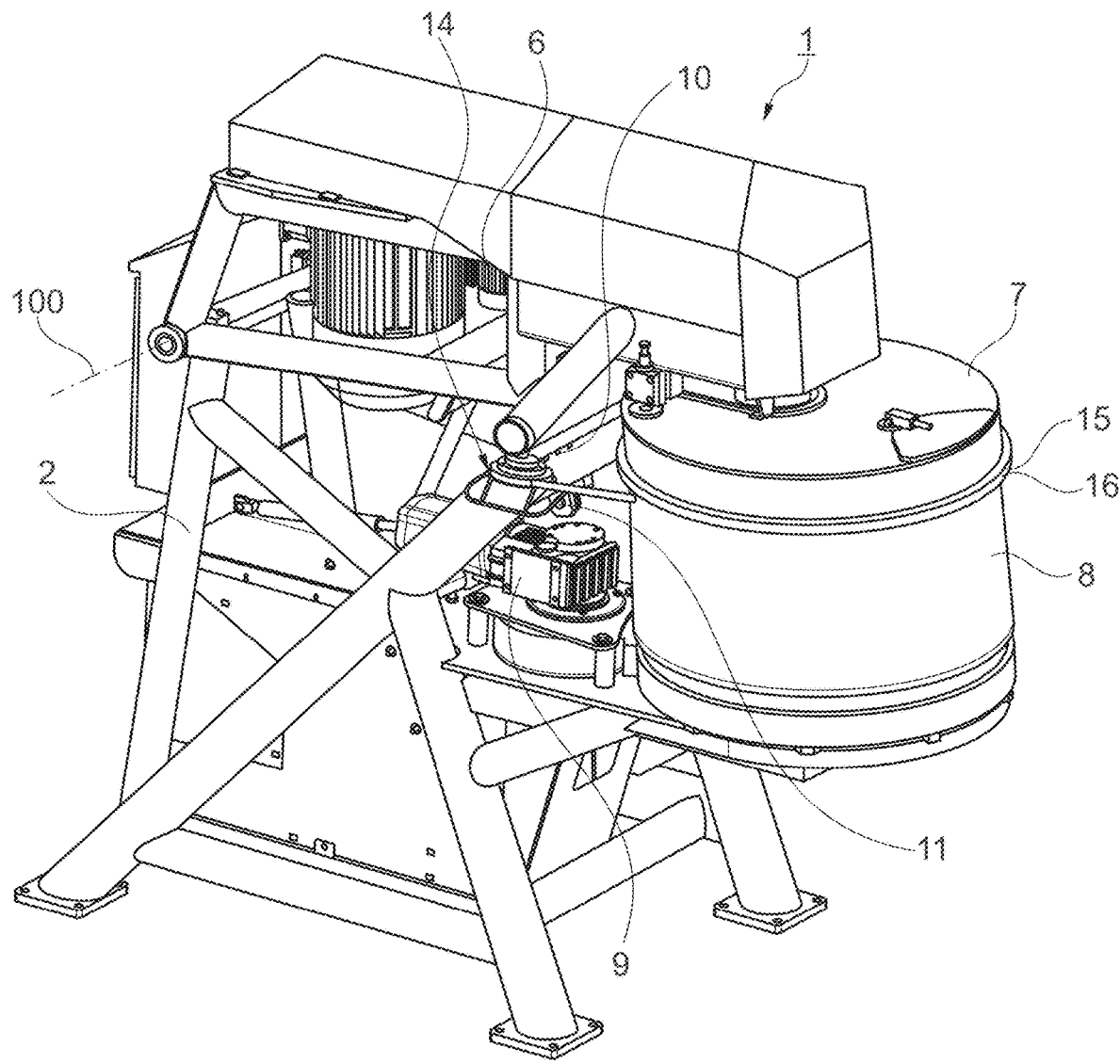
FIG. 2 shows a spatial representation of a kneading machine with kneading bowl in a lower operating position according to an example embodiment of the present disclosure.

FIGS. 1 and 2 show a kneading machine 1 for processing a food dough, in particular a baking dough. The kneading machine 1 has a kneading machine frame 2, the head portion 3 of which can be pivoted about a pivot axis 100 between a lower operating position and an upper cleaning position relative to a lower portion 4. The head portion 3 carries the kneading tool 5, shown here are two oppositely rotating spiral kneaders, and the drive 6 required for a rotation of the kneading tool 5, as well as a lid 7, which is provided for covering the kneading bowl 8, which is open at the top. The kneading bowl 8 and an electric motor 9 are arranged in the lower portion 4 of the kneading machine 1. The electric motor 9 rotates the kneading bowl 8 about an axis of rotation, which is not shown, relative to the kneading machine frame 2. An opening, which is not shown, is provided in the bottom of the kneading bowl 8 and can be closed by a closing mechanism. After the kneading process, to discharge the dough from the kneading bowl 8, the closing mechanism is actuated so that the opening is released, and the dough can be discharged downwardly from the kneading bowl 8. Furthermore, a swivel drive 10 is placed in the head portion 3, which is structured as a linear drive and has an electric motor. The swivel drive 10 is supported on the lower portion 4 in a swivel joint 11. By moving the linear drive, the distance from the head portion 3 to the lower portion 4 is increased or decreased, resulting in a pivoting of the head portion 3 relative to the stationary lower portion 4 about the pivot axis 100.

Two trunnions 12 are provided on the lower portion 4 of the kneading machine frame 2, which extend parallel to the axis of rotation of the kneading bowl 8 and thus orthogonally to the floor on which the kneading machine 1 stands. The trunnions 12 are each arranged on one side of the kneading bowl 8. They are conical in shape and taper in the direction of the lid 7. They are received in corresponding and matching receptacles 13 in the head portion 3 during the pivoting process, towards the end of the movement into the operating position. The trunnions 12 serve as a stop for the pivoting movement and as a positioning aid for the head portion 3 on the lower portion 4 of the frame 2. In addition, the forces acting on the kneading machine frame 2 during a kneading process are absorbed in the trunnion bearing 14 formed by the trunnion and the receptacle, so that the position of the head portion 3 on the lower portion 4 is secured. In the area around the trunnion 12, the head portion 3 lies in contact with the lower portion 4 in the operating position and the lower portion 4 forms a support surface for the head portion 3.

FIG. 1 shows the cleaning position in which the kneading tool 5 and the interior of the kneading bowl 8 are freely accessible for cleaning and service work.

FIG. 2 shows the operating state. The opening of the kneading bowl 8 is completely covered by the lid 7 and the two trunnions 12 of the lower portion 4 engage in the respective receptacle 13 of the head portion 3 of the kneading machine 1.

During the swiveling process, there is a risk of crushing both between the kneading bowl 8 and the lid 7 and between the head portion 3 and the lower portion 4 in the area of the trunnion bearings 14.

To reduce or eliminate the risk of injury in these two areas, a safety device 15 comprising a first safety ring 18 is provided, which ring surrounds the lid 7 on the circumference and projects beyond the underside of the lid 7 in the direction of the kneading bowl 8. The first safety ring 18 is attached to the lid 7 movably relative to the latter. The overlap 16 ensures that, in the event of entrapment, the first thing that happens is that the first safety ring 18 encounters an obstacle lying between the lid and the kneading bowl, such as a finger or a hand. In this case, the first safety ring 18 moves relative to the lid 7, which still moves further in the direction of the operating position. This relative movement is used to actuate a switch, reversing the direction of rotation of the electric motor of the swivel drive 10 and thus preventing the obstacle from being crushed.

Figure 3:
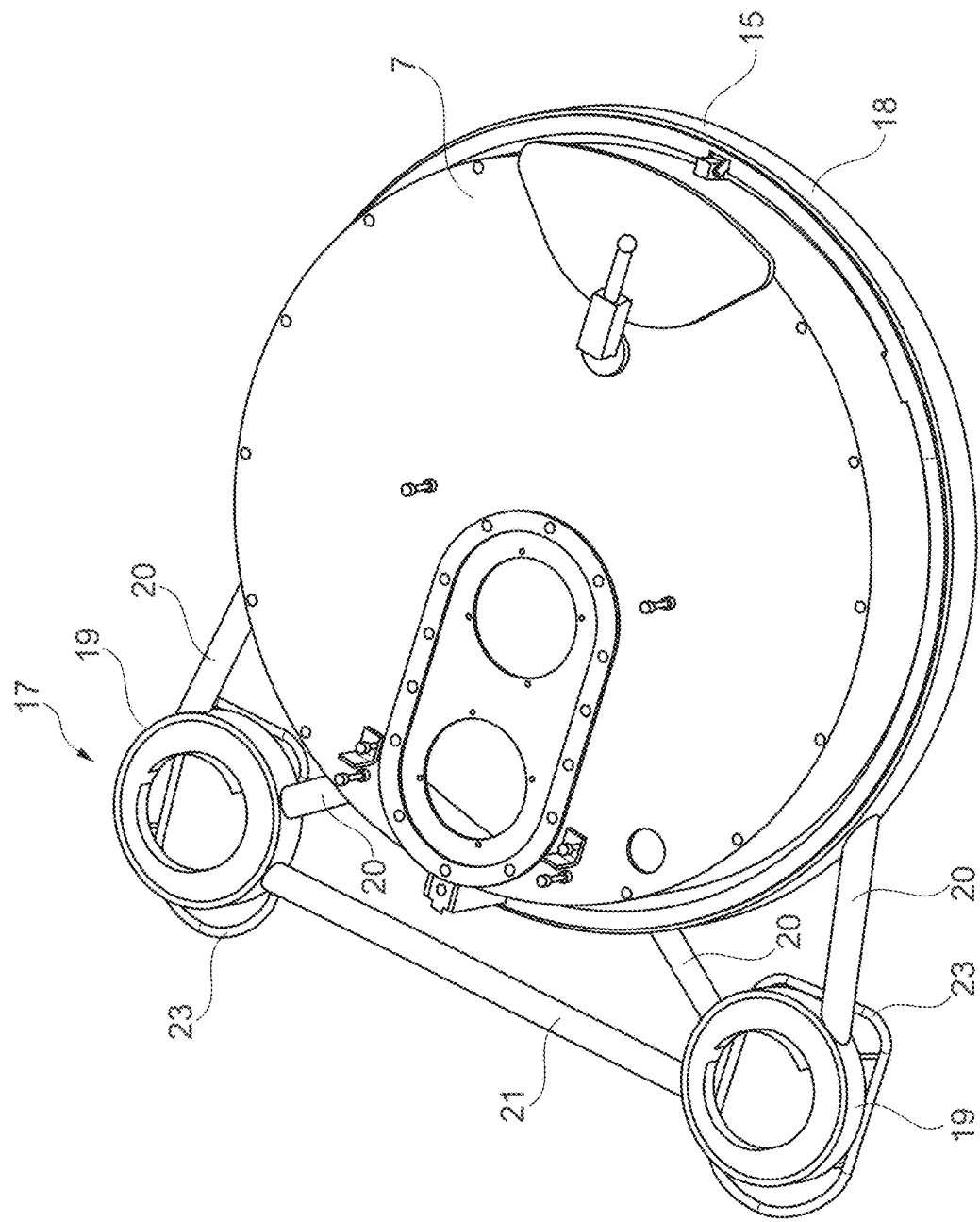
FIG. 3 shows a spatial view of a lid of a kneading bowl with a safety device according to an example embodiment of the present disclosure.
Figure 4:
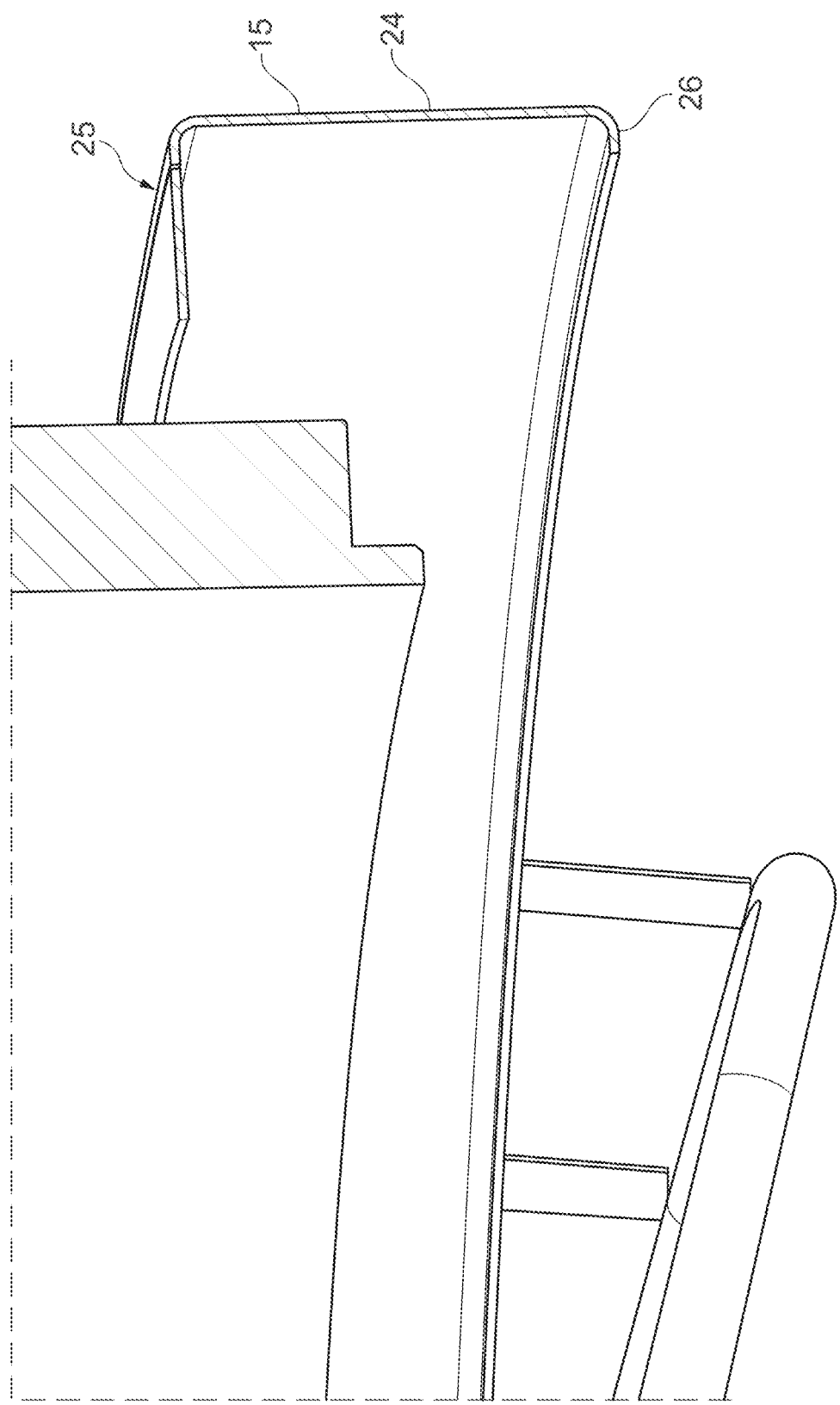
FIG. 4 shows a detailed view of a safety ring of a safety device with a longitudinal section according to an example embodiment of the present disclosure.

FIGS. 3 and 4 show the safety device 15 acting as a pinch guard in detail. The first safety ring 18 is formed in one piece with a pinch protection device 17 for the two trunnion bearings. The pinch protection device 17 has two further safety rings 19, which are arranged at a distance from one another and are attached to the first safety ring 18 of the safety device 15 by struts 20. In order to increase the stability of the safety device 15, the two further small safety rings 19 are also connected to each other by a strut 21. As can be seen in FIG. 1, the two further small safety rings 19 are designed in such a way that they surround the receptacles 13 of the trunnion bearing in the head portion 3 of the kneading machine frame 2 on the circumferential side and project downwards, so that an overlap 22 is formed. In this case, the overlap 22 is greater than the trunnion height or the penetration depth of the trunnion 12 into the receptacle 13. The safety device 15 can have an attachment 23 in the form of a circumferential railing in the region of the pinch protection device 17 for the trunnion bearings at its end near the lower portion. The attachment 23 forms the required overlap 22. Since the attachment 23 is not full-surface, weight can be saved. The attachment 23 is preferably formed in one piece with the respective safety ring.

The overlap 22 ensures that in the event of pinching, the first thing that happens is that one of the safety rings encounters an obstacle located between the head portion 3 and the trunnion 12. Also in this case, the first safety ring 18 shifts relative to the lid 7, which is used to actuate the switch to prevent the obstacle from being crushed. However, it may also be provided that the two smaller safety rings 19 have one or each an additional switch that can detect relative movement of the small safety rings 19 with respect to the head portion 3 and trigger a change in the rotational movement of the electric motor independently of the switch of the first safety ring 18.

FIG. 4 shows in detail the first safety ring 18 of the safety device 15. It is formed from a stainless steel sheet which has a thickness of approximately 1.5 mm. The first safety ring 18 is essentially cylindrical in shape and has a jacket 24 with two edge regions 25,26. In longitudinal section, the first safety ring 18 is substantially U-shaped. The two legs of the u-shaped profile or the two edge regions 25,26 are formed by bending over, in particular flanging, the edges of the stainless steel sheet. The edge is stiffened by the bending, so that the thin sheet thickness is sufficient to achieve the required rigidity of the safety device 15. The lower edge region 26 remote from the lid is preferably between 5 and 10 mm wide, in particular 8 mm wide. The lower edge region 26 thus has a larger bearing surface than the bare sheet thickness, so that in the event of entrapment the force acting on the obstacle can be distributed over a larger area, thereby further minimizing the risk of injury. The thin sheet thickness has the advantage of reducing weight and cost. The lateral surface of the jacket 24 of the first safety ring is preferably flat on the inside and outside. However, it can also have a profile that further stiffens the base body 18 of the safety ring 15, for example a wave-like profile.

Preferably, the two smaller safety rings of the pinch protection device of the two trunnion bearings are designed like the first safety ring.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A kneading machine for food doughs, comprising:
    a kneading machine frame with a lower portion and a head movable relative to the lower portion between a lower operating position and an upper cleaning position;
    a kneading bowl capable of being provided on the lower portion; and
    a drivable kneading tool and a lid to close an opening of the kneading bowl in the operating position provided on the head; wherein
    the lid is surrounded on a circumferential side by a first safety ring of a safety device which projects beyond the lid on an underside thereof and which is movably fastened to the lid;
    the safety device includes a detector to detect a relative movement between the lid and the first safety ring;
    the kneading machine frame includes at least two trunnion bearings, each of which includes a trunnion and a matching receptacle, one of the trunnion and the matching receptacle is on the lower portion and another of the trunnion and the matching receptacle is on the head such that the trunnion and the matching receptacle engage with each other in the lower operating position and secure a position of the head with respect to the lower portion; and
    the first safety ring is provided integrally with a pinch protector of the at least two trunnion bearings.

2. The kneading machine according to claim 1, wherein the pinch protector of the at least two trunnion bearings includes a further safety ring which surrounds the trunnion bearing fastened to the head on the circumferential side and projects downwards, so that an overlap is provided.

3. The kneading machine according to claim 2, wherein the overlap of the pinch protector is greater than a trunnion height or a penetration depth of the trunnion in the receptacle.

4. The kneading machine according to claim 1, wherein the trunnions are conical and tapered in a direction of the receptacle.

5. The kneading machine according to claim 1, wherein the kneading machine includes two trunnion bearings, each of which is on one side of the kneading bowl in a plan view.

6. The kneading machine according to claim 1, wherein the trunnions are attached to the lower portion and the head includes the matching receptacles.

7. The kneading machine according to claim 1, wherein the detector is structured to also detect a relative movement between the head and the pinching protector.

8. The kneading machine according to claim 1, wherein the safety device includes a second detector to detect a relative movement between the head and the safety device.

9. The kneading machine according to claim 1, wherein the first safety ring is cylindrical or substantially cylindrical and includes a circumferential jacket with two edge regions that are bent over to stiffen the first safety ring.

10. The kneading machine according to claim 9, wherein the first safety ring is made of stainless steel sheet having a thickness between about 1 mm and about 3 mm.

11. The kneading machine according to claim 9, wherein a lower one of the two edge regions which is remote from the lid has a width of between about 5 mm and 15 mm.

12. A method of pivoting a kneading tool into a kneading bowl of a kneading machine for food doughs,
    the kneading machine including a kneading machine frame with a lower portion and a head movable relative to the lower portion between a lower operating position and an upper cleaning position;
    the kneading bowl is capable of being provided on the lower portion and a drivable kneading tool and a lid closing an opening of the kneading bowl in the operating position are provided on the head;

the lid is circumferentially surrounded by a first safety ring of a safety device which projects beyond the lid on an underside thereof and which is movably secured thereto;

the safety device includes a detector to detect a relative movement between the lid and the first safety ring and the kneading machine frame includes at least two trunnion bearings, each defined by a trunnion and a matching receptacle;

one of the trunnion and the matching receptacle is on the lower portion and another of the trunnion and the matching receptacle is on the head such that in the lower operating position the trunnion and the matching receptacle interlock and secure the position of the head with respect to the lower portion; and the first safety ring is a single structure integral with a pinch protector of the at least two trunnion bearings, each of the trunnion bearings includes a further safety ring which surrounds the trunnion or the matching receptacle fastened to the head on a circumferential side, is fastened movably to trunnion or the matching receptacle and projects downwards, so that an overlap is defined, the method comprising:
a) moving the head relative to the lower portion from the upper cleaning position to the lower operating position;
b) inserting an obstruction into a still open one of the at least two trunnion bearings;
c) detecting a relative movement between the safety device and the head; and
d) moving the head in a direction of the upper cleaning position.

13. The method according to claim 12, wherein in d) the head is pivoted into the upper cleaning position.

14. The method according to claim 12, wherein the detecting in c) is carried out by the detector or a second detector attached to the pinch protector in addition to the detector.

15. The method according to claim 12, wherein the method further comprises the following after a):
e) inserting an obstacle between the kneading bowl and the lid;
f) detecting relative movement between the first safety ring and the lid; and
g) controlling an electric motor of a swivel drive so that the head is moved in a direction of the upper cleaning position.

* * * * *